(No Model.) 5 Sheets—Sheet 1.

F. HASKELL.
MACHINE FOR SPLITTING WARPS.

No. 381,998. Patented May 1, 1888.

Witnesses
Wm. S. Edwards
Geo. N. Fumald

Inventor
Frank Haskell
BY _____ ATTORNEY (No Model.) 5 Sheets—Sheet 2.
F. HASKELL.
MACHINE FOR SPLITTING WARPS.
No. 381,998. Patented May 1, 1888.
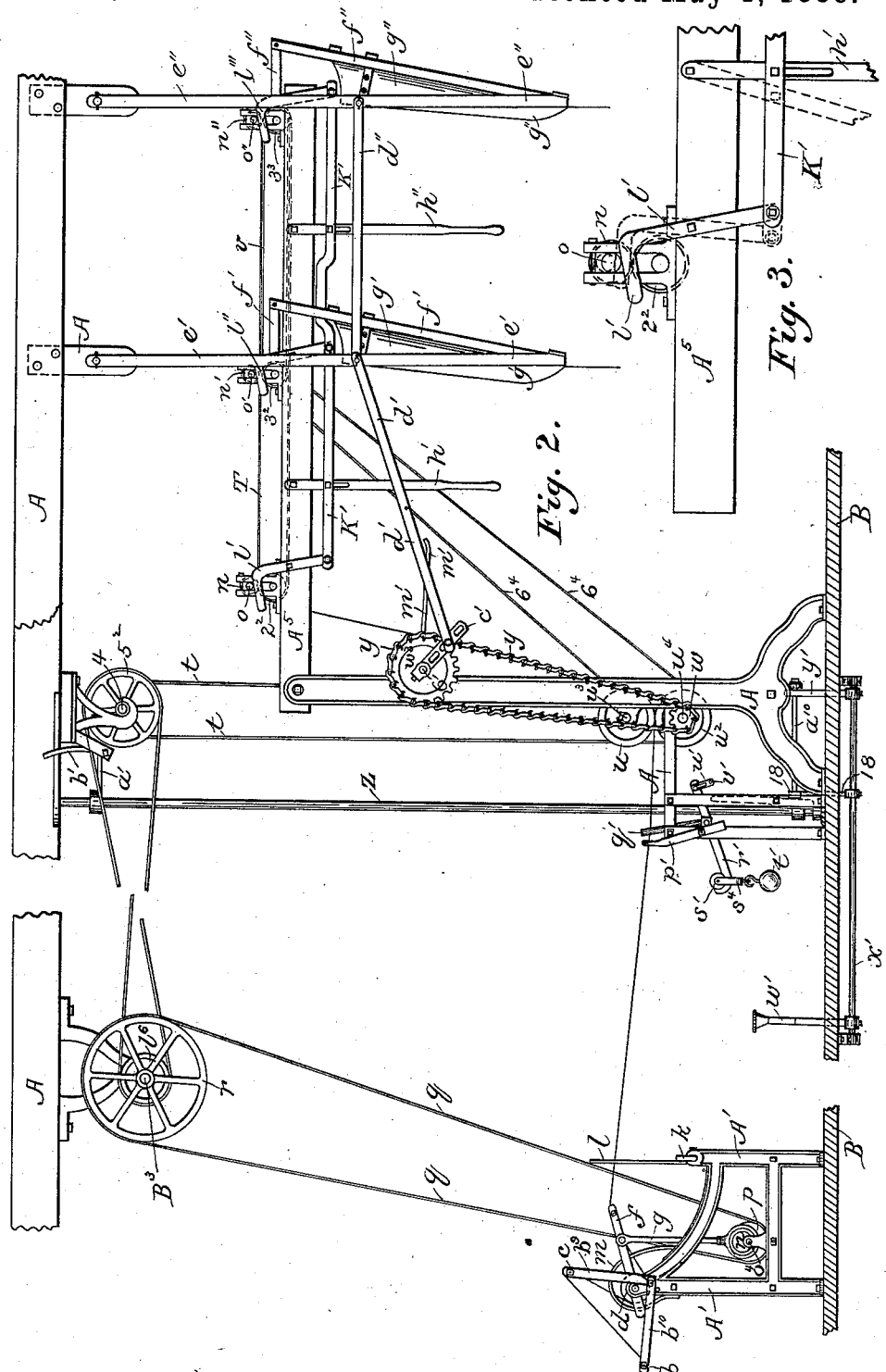
Witnesses,
Wm. B. Edwards.
Geo. N. Fitzgerald.
Inventor.
Frank Haskell.
By Fed. F. Bird, ATTORNEY (No Model.) 5 Sheets—Sheet 3.
F. HASKELL.
MACHINE FOR SPLITTING WARPS.
No. 381,998. Patented May 1, 1888.
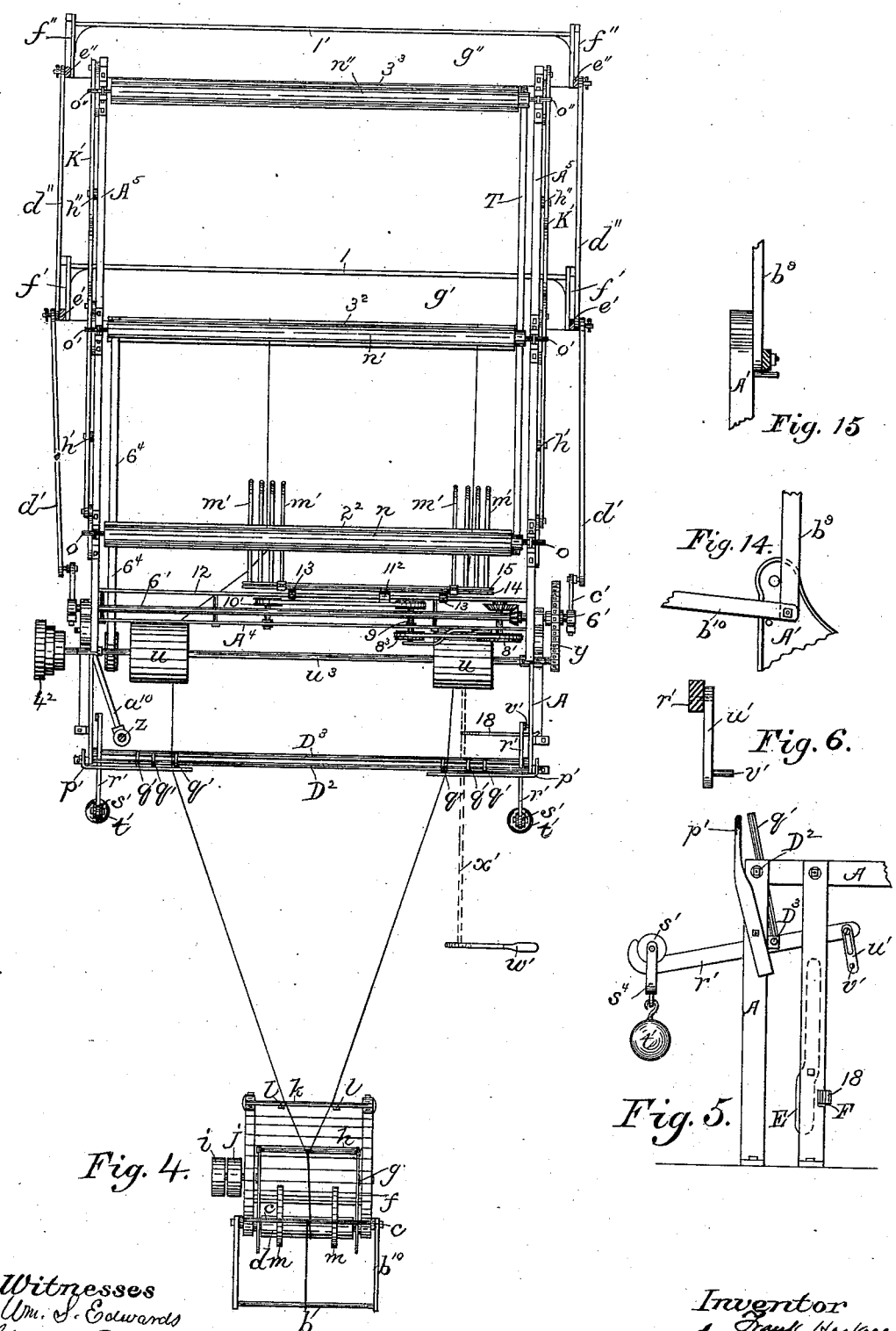

(No Model.) 5 Sheets—Sheet 4.

F. HASKELL.
MACHINE FOR SPLITTING WARPS.

No. 381,998. Patented May 1, 1888.

Witnesses.
Wm. S. Edwards.
Geo. N. Fernald.

Inventor.
Frank Haskell.
By Geo. S. Bird Attorney (No Model.)  5 Sheets—Sheet 5.
F. HASKELL.
MACHINE FOR SPLITTING WARPS.
No. 381,998. Patented May 1, 1888.
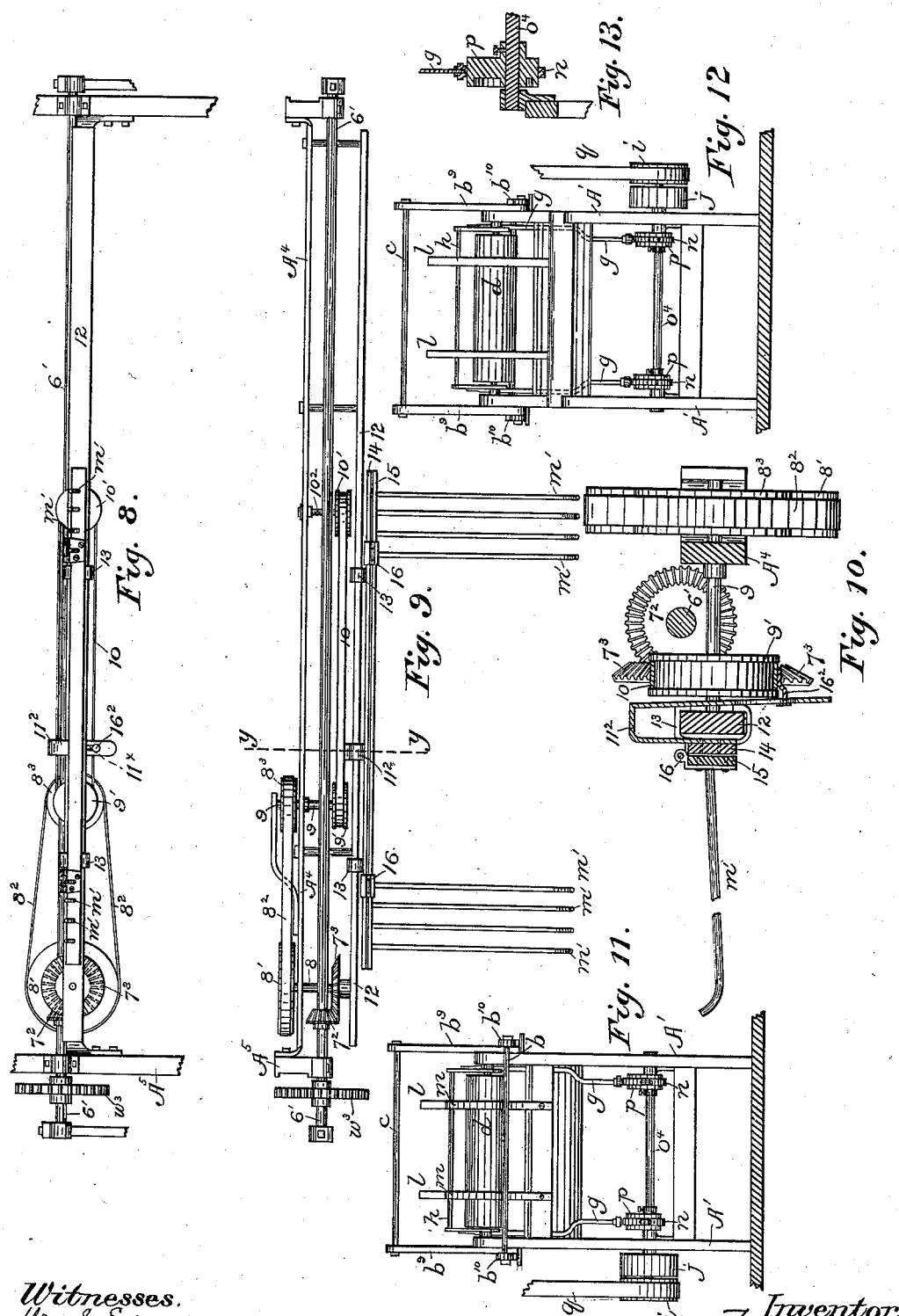

UNITED STATES PATENT OFFICE.

FRANK HASKELL, OF WESTBROOK, MAINE.

MACHINE FOR SPLITTING WARPS.

SPECIFICATION forming part of Letters Patent No. 381,998, dated May 1, 1888.

Application filed April 9, 1887. Serial No. 234,240. (No model.)

*To all whom it may concern:*

Be it known that I, FRANK HASKELL, of Westbrook, in the county of Cumberland and State of Maine, have invented certain new and useful Improvements in Machines for Splitting Warps; and I do hereby declare that the following is a full, clear, and exact description of the invention, that will enable others skilled in the art to which it appertains to make and use the same, reference being had to the accompanying drawings, forming a part of this specification, in which—

Figure 1:
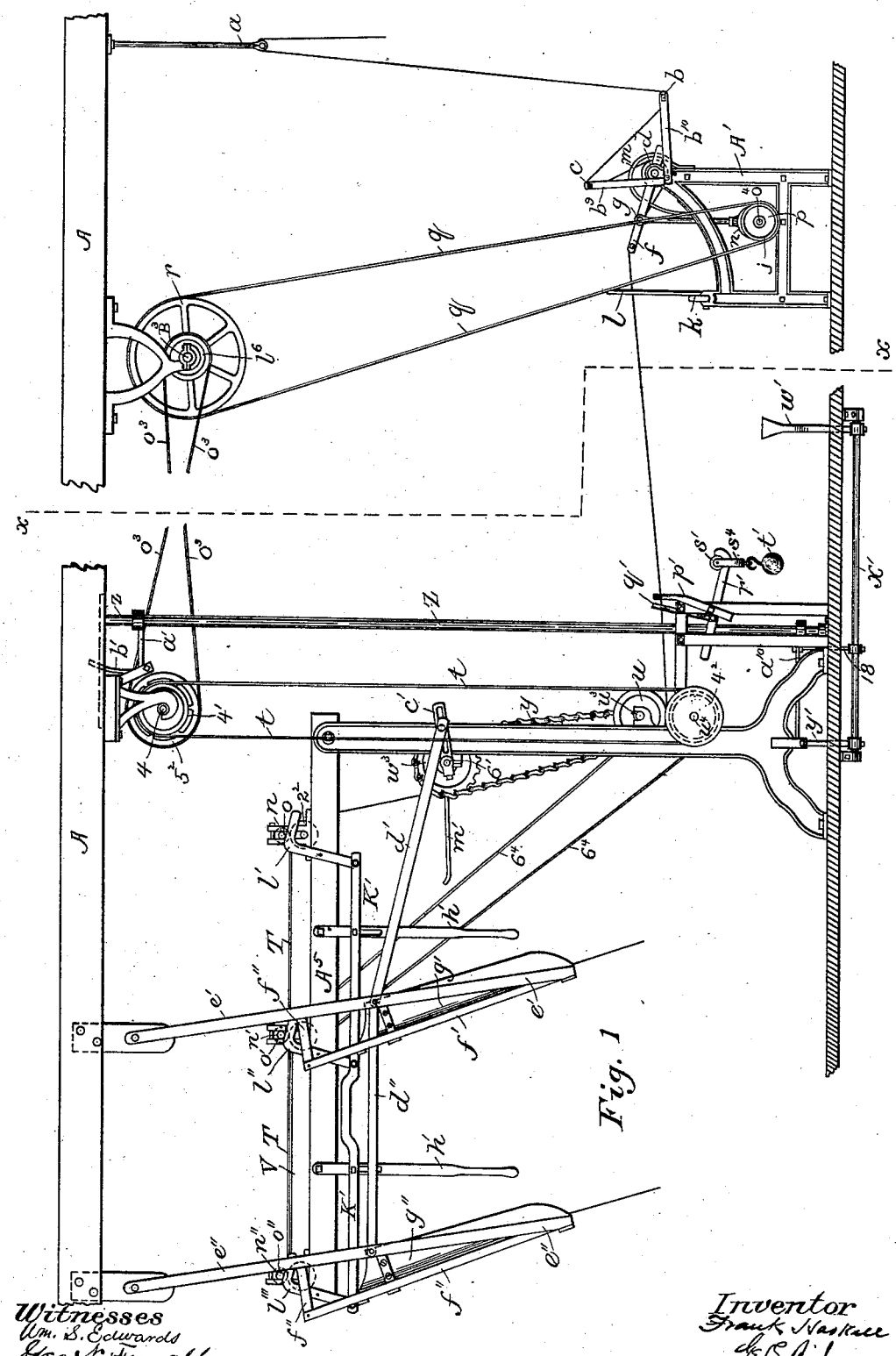
Figure 7:
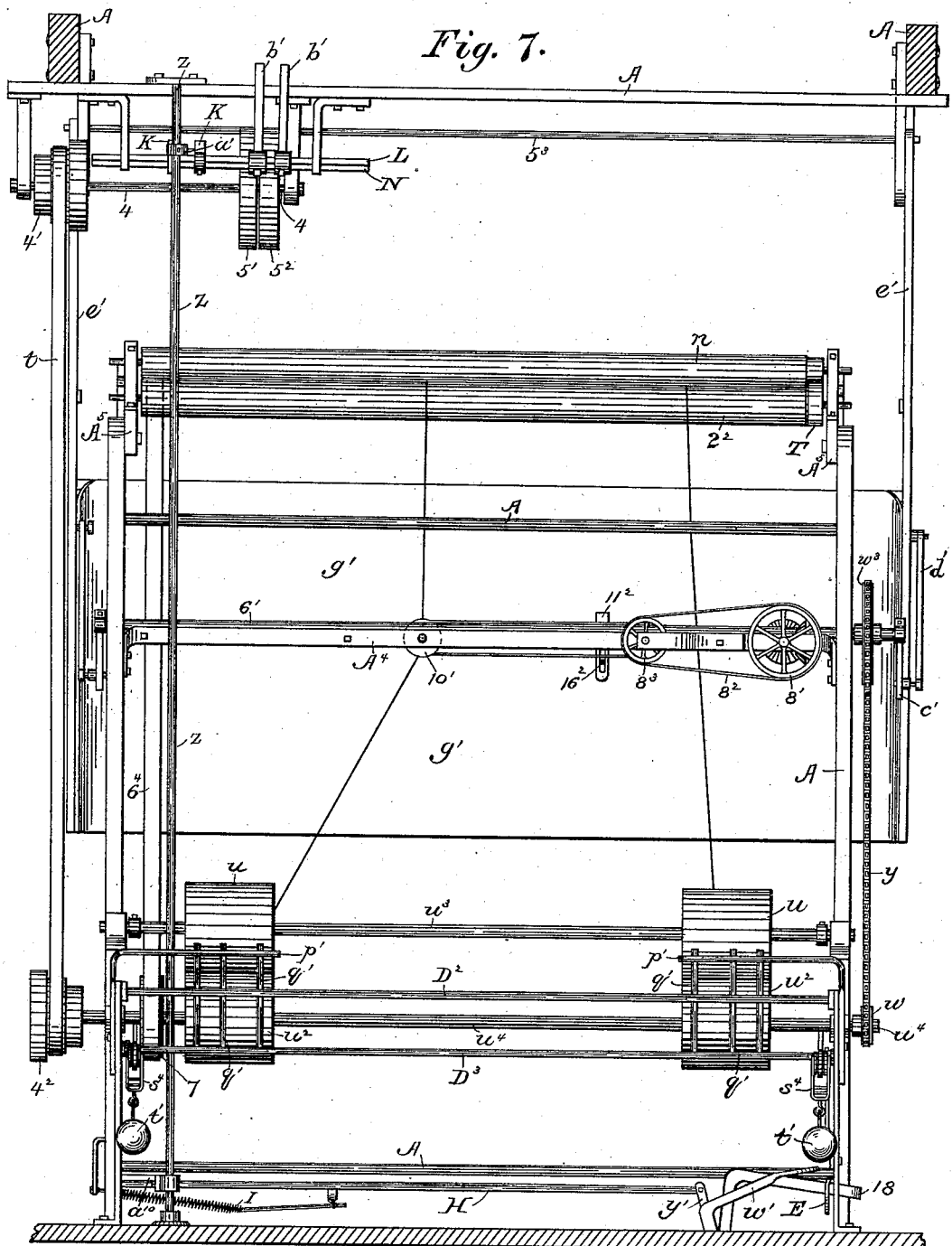

Figure 1 is a side elevation, partly broken out, of the machine; Fig. 2, a side elevation, also partly broken out, of the opposite side; Fig. 3, a detail of the device for raising the roller $n$; Fig. 4, a top plan of the machine; Fig. 5, a detail of part of the stop mechanism; Fig. 6, a detail of the arm $u'$ with pin $v'$ of Fig. 5; Fig. 7, a vertical transverse section through the line $x\,y$ of Fig. 1, but on a larger scale. Fig. 8 is a detail showing in elevation the devices for carrying the warp from side to side; Fig. 9, a top plan of the same. Fig. 10 is a vertical section through the line $x\,x$ of Fig. 9, but on a larger scale; Fig. 11, a front elevation of the feeding and agitating mechanism; Fig. 12, a rear view of the same; Fig. 13, a central section of the eccentric and associated parts; Fig. 14, a detail side view of the arms $b^9$ and $b^{10}$, and Fig. 15 an edge view of the same.

My invention relates to devices for splitting warps after they have been dyed.

It consists in a mechanism for separating the warps or chains of yarn. In connection with this mechanism a device for folding the warps after they have been split or separated is also shown.

The separating or splitting mechanism consists of a friction device, a roller, (if desired,) and means for agitating the warp or chain at or about the point of separation, another set of guides with stop-motion, and one or more sets of rollers. As constructed in the drawings, it may be described as follows:

A frame, A', of simple construction, is provided, which has at the front upper part, on either side, an upright arm, $b^9$, to the ends of which arm is secured a rod, $c$. Pivoted to the frame outside the arms $b^9$ are the arms $b^{10}$, between the ends of which is the rod $b$. (See Figs. 1 and 2.) The arms $b^9$ and $b^{10}$ are attached to the side of the frame A' by bolts and nuts, being held so closely that considerable force will be necessary to move the arms $b^{10}$ upon the bolt, which acts as a pivot. Fixed to the front of the frame are the bent guides $m\,m$. (See Fig. 1.) Beneath the guides $m\,m$, journaled in the frame, is the roller $d$, pivoted upon the shaft of which, at either end, are the levers $f\,f$, between the ends of which is the rod $n$. Pivoted to each of these levers $f\,f$, at points equally distant from the shaft of the roller $d$, are the eccentric-rods $g\,g$, connected below with the eccentrics $n\,n$ on the shaft $o^4$, on which is also the pulley $j$. The pulley $j$ is connected by the belt $q$ with the pulley $r$ on the shaft $B^3$, by which power is furnished for driving the machine. At the rear of the frame A' are the guides $l\,l$ and the rod K.

Behind the frame A' is placed the frame A, which is of much greater width than the frame A'. (See Fig. 4.) At the front of the frame A' is the shaft $u^4$, (see Figs. 1, 2, and 7,) having outside the frame the fixed pulley $4^2$, which is connected by the belt $t$ with the pulley $4'$ on the shaft 4, which has also the pulley $5^2$, which is connected by belt $O^3$ with the pulley $l^6$ on the shaft $B^3$. Within the frame, upon either side, the shaft $u^4$ has the rollers $u^2\,u^2$, directly above which are the pulleys $u\,u$, fixed on the shaft $u^3$.

Fixed to either side of the frame A, in front of the shaft $u^3$, are the bent arms or guides $p'\,p'$, each extending inward to a point slightly within the inner edges of the rollers $u\,u$, respectively. (See Fig. 4.) Below the guides $p'\,p'$ is the rod $D^2$, extending from side to side of the machine, while below the rod $D^2$ is the rod or shaft $D^3$, which is journaled in the frame A A. To this rod or shaft $D^3$ are fixed the upright fingers $q'\,q'\,q'$, three or more in number on each side, so arranged as to be opposite the rollers $u\,u^2$. (See Fig. 7.) Fixed to the rod or shaft $D^3$, at either end, are the levers $r'$, upon which are the grooved rollers $s'$, to which are connected by the yokes $s^4$ the weights $t'$. At the other end of the lever $r'$, which is upon the right-hand side of the frame, is attached the arm $u'$, having the pin $v'$ at its lower end. (See Figs. 5 and 6.) The pin $v'$ is so located that upon the depression of the end of the lever $r'$, which bears it, it will engage the lever E, which is pivoted upon the inside of the frame A. The rear of that part of the frame to which the lever E is pivoted has the slot F, (see Fig. 5,) in which is placed the bent lever 18, the other end of which is fixed to the rod $x'$ beneath the floor. (See Figs. 2, 4, and 7.) The arm $y'$, rigidly fixed to the rod $x'$, is pivoted at its upper end to the rod H, (see Fig. 7,) which has the spring I connected with it and the frame of the machine, and is pivotally attached to the horizontal arm $a^{10}$, which is rigidly fixed to the lower end of the vertical rod $z$. This rod $z$ is provided at the top with the arm $a'$, which plays between the vertical guides K K, which are fixed upon the horizontal slide, which moves freely upon the plate N. (See Fig. 7.) The slide L has the shipper-guides $b'b'$, through which passes the belt $O^3$, connecting the pulley $b^6$ with the pulley $5^2$ upon the shaft 4. This shaft is also provided with the loose pulley 5'. The rod $x'$ may be provided with the pedal $w'$.

The mechanism for folding the warp after it is split may be described as follows: The shaft $u^4$, outside the frame A, has the toothed wheel $w$, which is connected by the chain $y$ with the toothed wheel $w^3$ on the shaft 6'. (See Figs. 2 and 7.) The shaft 6' is journaled in the sides of the frame A. Parallel with the shaft 6', on either side, are the supports or bars $A^4$ and 12, secured at either end to the frame A. It is provided with the skew-beveled gear $7^2$, matching with the skew-beveled gear $7^3$ on the shaft 8, journaled at either end in the supports or bars $A^4$ and 12, which latter has the pulley 8', connected by the belt $8^2$ with the pulley $8^3$ on the shaft 9. Likewise, on the shaft 9, which is supported by the support or bar $A^4$, is the pulley 9', which is connected by the belt 10 with the pulley 10' on the shaft $10^2$, which is supported by the support or bar $A^4$. Fixed to the belt 10 (see Fig. 10) is a pin or bolt, $16^2$, playing in a slot, $11^\times$, in the clasp $11^2$, which, like the clasp 13, slides up in the support or bar 12. (See Figs. 8, 9, and 10.) To the clasps $11^2$ and 13 is rigidly fastened the plate 14, to which is hinged the plate 15, (see Fig. 10,) the latter being provided at either end with the fingers or guides $m'm'$. (See Fig. 9.) From the sides of the upper part of the frame depend the arms $e'e'$, between which is the frame $f'f'$, carrying the apron $g'$. In the rear of the arms $e'$ are similar arms $e''$, having a like frame, $f''$, and apron $g''$. The two arms $e'e''$ are connected by rods $d''$, which are pivoted to the arms; also, pivoted to the arms $e'$ are the connecting-rods $d'$, which at the other ends are pivoted to the cranks $c'$, which are fixed upon the shaft 6'. (See Figs. 1 and 2.) Just above the tops of the aprons $g'g''$, upon a horizontal portion of the frame A, are the rollers $2^2$, $3^2$, and $3^3$, the two latter being placed in substantially the same vertical planes as the pivots of the arms $e'$ and $e''$, respectively.

From the pulley 7 on the shaft $u^4$ the belt $6^4$ passes around the roller $3^2$, while at the other end of the latter the belt V connects it with the roller $3^3$. Passing around the belt V, the belt T connects the roller $3^3$ with the roller $2^2$. Above the rollers $2^2$, $3^2$, and $3^3$, respectively, and resting upon them are the loose rollers $n\ n'\ n''$, the journals of which $o\ o'\ o^2$ extend over the bent levers $l'\ l''\ l'''$, the lower ends of which are pivoted to the rod K', to which and to the frame $A^5$ the levers $h$ and $h'$ are pivoted. (See Figs. 1, 2, 3.)

In operation the end of the chain or warp may be placed over a roller or similar device somewhat above the frame A', as is indicated in Figs. 1 and 2, $a$ being a roller. Passing over this roller, the warp or chain is carried under the rod $b$ and over the rod $c$, between the guides $m\ m$, under the roller $d$. These devices are employed to give the chain the requisite tension, and it is to adjust this tension that the arms $b^{10}$ are made movable, the greatest degree of tension being had when the arms $b^{10}$ are at right angles to the arms $b^9$, which is reduced as the arms $b^{10}$ are carried upward toward the arms $b^9$. The office of the guides $m\ m$, as of the guides $l\ l$, is simply to keep the chain from contact with the sides of the machine. The chain, as it comes from under the roller $d$, is separated or split by hand, and the separate parts carried over the rod $h$, by which the yarns are shaken or agitated to facilitate the separation. The separated parts are then led between the guides $l\ l$, and thence under the bent guides $p'p'$, between the fingers $q'\ q'$ and the rollers $u$ and $u^2$, upon either side of the machine. By the rollers $u\ u^2$ the chain is drawn through the machine until it is completely separated. Where the folding device is used, as hereinafter described, the use of the lower roller, $u^2$, may be dispensed with, the chain being carried under the roller $u$, or any loose roller substituted for it, and between the rollers $n$ and $2^2$, which will draw the parts of the chain onward at the same time that it delivers them to the folding device. This, however, will not probably be found fully adequate with heavy chains, but quite sufficient with light chains or chains which have already been once split. Of course a larger number of rods may be used in the device for providing tension, and the agitating mechanism may be duplicated, if found necessary, in handling very heavy chains.

Should the chain at any point fail to separate from any cause, the machine is brought to a standstill by the stop mechanism. As the point at which the yarns adhere is brought near the fingers $q'\ q'$, the pressure from the parts of the chain upon the fingers $q'\ q'$ upon either side of the machine causes these fingers to tip backward, overcoming the effect of the weight upon the pulley $s$, which runs up the lever $r'$, which, being depressed, brings the pin $v'$ in contact with the upper part of the lever E, causing the lower part of the lever to throw the lever 18 out of the slot F, leaving the rod H free to be drawn toward the other side of the machine by the spring I, thus turning the upright rod $z$, which, by means of the arm $a'$, operating on the shipper-guides $b'$ $b'$, transfers the belt $O^3$ from the pulley $5^2$ to the loose pulley $5'$, thus stopping the machine. The separation of the adhering parts being effected by the attendant, the treadle $d$ being depressed restores the lever 18 to its place in the slot F, while the separation of the chain permits the fingers $q'$ $q'$ to resume their position against the rod $D^2$.

As the separate parts of the chain leave the rollers $u^2$ $u^2$, they are carried up between the guides $m'$ $m'$ between the rollers $2^2$ and $n$, by which one part is delivered between the rollers $3^2$ and $n'$ to the apron $g'$, and the other part between the rollers $3^3$ and $n''$ to the apron $g''$. The travelers or slides 14 and 15, carrying the guides $m'$ $m'$, as they move from side to side, and the backward-and-forward motion of the aprons, fold the parts as they fall to the floor or into the proper receptacles.

Should the chain be caught, or for any reason it be desirable to stop the chain as it drops from the rollers upon the aprons without stopping the whole machine, the movement of the levers $h'$ $h''$ will raise the rollers $n$ $n'$ $n''$ from the rollers $2^2$, $3^2$, and $3^3$ and cause the movement of the chain to cease.

I do not regard the roller $d$ as essential. Its place may be supplied with a smooth rod.

What I claim is—

1. The combination of a tension device consisting of a series of rods supported by arms, a rod or bar with means for agitating the same, consisting of a lever and an eccentric and rods, and two or more pairs of rollers, substantially as described.

2. The combination of a tension device consisting of a series of rods with supporting-arms and a roller, a rod or bar with means for agitating the same, consisting of a lever and an eccentric and rods, and two or more pairs of rollers, substantially as described.

3. The combination of a tension device consisting of two or more rods with supporting-arms and a roller, a rod or bar with means for agitating the same, consisting of a lever and an eccentric and rod, two or more pairs of rollers, and a guide or guides in front of each pair of rollers, substantially as described.

4. The combination of the rods $b$ and $c$, supported by the arms $b^{10}$ and $b^9$, roller $d$, guides $m$ $m$, bar $f$ and means for agitating the same, fingers $q'$ $q'$, and rollers $u$ $u^2$, substantially as described.

5. The combination of the rods $b$ and $c$, supported by the arms $b^{10}$ and $b^9$, roller $d$, guides $m$ $m$, fingers $q'$ $q'$, guides $p'$ $p'$, and rollers $u$ $u^2$, substantially as described.

6. The combination of the guides $p'$ $p'$, fingers $q'$ $q'$, rod $D^2$, shaft $D^3$, lever $r'$, pulley $s'$, weighted carrier $s^4$, arm $u'$, with pin $v'$, levers E and 18, the framing $a$, having the slot F, rod $x'$, arm $y'$, rod H, spring I, arm $a^{10}$, shaft $z$, arm $a'$, and shipper-guides, substantially as described.

In testimony that I claim the foregoing I have hereunto set my hand this 29th day of March, 1887.

FRANK HASKELL.

Witnesses:
 GEO. E. BIRD,
 AUG. L. SMITH.